United States Patent
Hruska

[19]

[11] Patent Number: 6,109,553
[45] Date of Patent: Aug. 29, 2000

[54] CROP MATERIAL PROCESSOR

[75] Inventor: Kevin Hruska, Gerald, Canada

[73] Assignee: Bridgeview Mfg. Inc., Gerald, Canada

[21] Appl. No.: 09/303,263

[22] Filed: Apr. 30, 1999

[30]    Foreign Application Priority Data

Oct. 13, 1998 [CA] Canada ..................................... 2250313

[51] Int. Cl.$^7$ ................................................. B02C 19/12
[52] U.S. Cl. ........................ 241/189.1; 241/194; 241/605
[58] Field of Search ..................... 241/194, 195, 241/605, 186.2, 186.3, 36, 189.1, 101.763, 101.762, 101.76, 101.761, 101.75

[56]                References Cited

U.S. PATENT DOCUMENTS

| 3,436,028 | 4/1969 | Koehnen et al. . |
| 3,979,077 | 9/1976 | Dalman . |
| 3,999,674 | 12/1976 | Meitl . |
| 4,083,501 | 4/1978 | Ryan . |
| 4,094,427 | 6/1978 | White et al. . |
| 4,101,081 | 7/1978 | Ritter et al. . |
| 4,151,961 | 5/1979 | Makofka et al. . |
| 4,218,022 | 8/1980 | Boehm et al. . |

(List continued on next page.)

FOREIGN PATENT DOCUMENTS

| 2179121 | 12/1997 | Canada . |
| 2191692 | 10/1998 | Canada . |
| 2100106 | 12/1982 | United Kingdom . |
| 2101882 | 1/1983 | United Kingdom . |

OTHER PUBLICATIONS

Advertisement entitled "srotolatore distributore per rotoballe unroller distributor for roundbales derouleur distributeur pour balles rondes abroller verteiler für rundballen" G902.

Advertisement entitled "Bale Processor" Vermeer Manufacturing Company.

Internet advertisement entitled "Haybuster" DuraTech Industries International, Agricultural Product Division.
Internet advertisement entitled "8610 Bale Processor" Case IH Agriculture Equipment.
Advertising material entitled "EZ Feed 280" for Highline Mfg, Inc.
Advertisement entitled "Bale Processor" from Jiffy by Westward Products Ltd.

(List continued on next page.)

*Primary Examiner*—Mark Rosenbaum
*Attorney, Agent, or Firm*—Killworth, Gottman, Hagan & Schaeff, LLP

[57]                ABSTRACT

A baled crop material processor for disintegrating baled crop material comprising a container, a disintegrator, a discharge opening and means for manipulating the crop material for disintegration by the disintegrator. The container, receives and contains the crop material. The disintegrator comprises a flail roller that is mounted within the container and has a number of flails pivotally mounted about it. The flail roller rotates about its own longitudinal axis in either a clockwise or counter-clockwise direction. The discharge opening is at the bottom of one of the side walls to discharge the disintegrated crop material either to the left or to the right of the processor and in a bidirectional processor, the operator may alternate between sides. The manipulation means comprises manipulator rollers having paddles positioned at an angle to the length of the roller to rotate the crop material without substantially breaking the crop material apart. The paddles are channel shaped with outwardly curved ends to grasp the baled crop material for rotation and then to pull out of the crop material due to the curved end as the roller is rotated. Further, the angled paddles guide the crop material longitudinally toward the centre of the crop material processor away from the front and back walls. Moreover, the sidewalls of the container are shaped to have a protrusion projecting into the container in close proximity to the paddles, a spacing below the protrusion to prevent the accumulation of loose material, and outwardly sloped wall portions above the protrusion.

30 Claims, 8 Drawing Sheets

U.S. PATENT DOCUMENTS

| | | |
|---|---|---|
| 4,448,361 | 5/1984 | Marcy . |
| 4,449,672 | 5/1984 | Morlock et al. . |
| 4,524,916 | 6/1985 | Keyes et al. . |
| 4,621,776 | 11/1986 | Hostetler . |
| 4,657,191 | 4/1987 | Dwyer et al. . |
| 4,779,810 | 10/1988 | Frey . |
| 4,830,292 | 5/1989 | Frey . |
| 4,951,883 | 8/1990 | Loppeli et al. . |
| 5,033,683 | 7/1991 | Taylor . |
| 5,071,079 | 12/1991 | Fykse et al. . |
| 5,090,630 | 2/1992 | Kopecky et al. . |
| 5,207,391 | 5/1993 | Anderson . |
| 5,255,867 | 10/1993 | Whittleton et al. . |
| 5,340,040 | 8/1994 | Bussiere et al. . |
| 5,601,241 | 2/1997 | Brewster . |
| 5,622,323 | 4/1997 | Krueger et al. . |
| 5,653,394 | 8/1997 | Bussiere et al. . |
| 5,738,287 | 4/1998 | Vanderberg . |

OTHER PUBLICATIONS

Advertisement entitled "Knudson Round Bale to Mixer Mill Processor" Knudson Manufacturing and Equipment Ltd.

Advertisement entitled "Model BP–25 Bale Processor" Hesston The Prime Line, Hesston Corporation.

Advertisement entitled "Load and Feed Big Bales from Your Tractor or Pickup" DewEze Super Slicer, DewEze Mfg. Co.

Advertisement entitled "Silachop Bale Processor for esier feeding and higher feed in–take" UN7860 Silachop UN 7865 Silachop Kverneland Underhaug AS.

Advertisement entitled "Kwikmixer—3" Henke Machine Inc.

Advertisement entitled "Round Bale Transport Feeder" Big John Manufacturing Co., Inc.

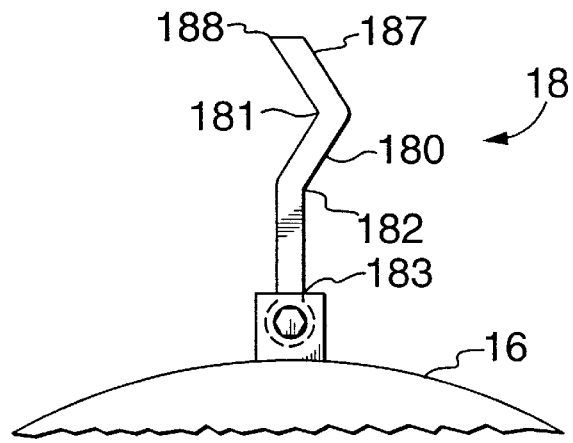
FIG. 4
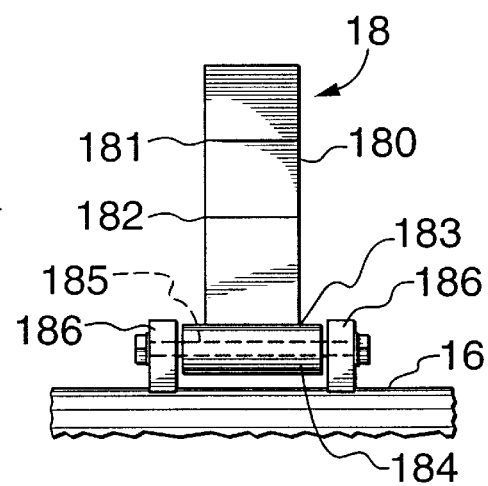
FIG. 5
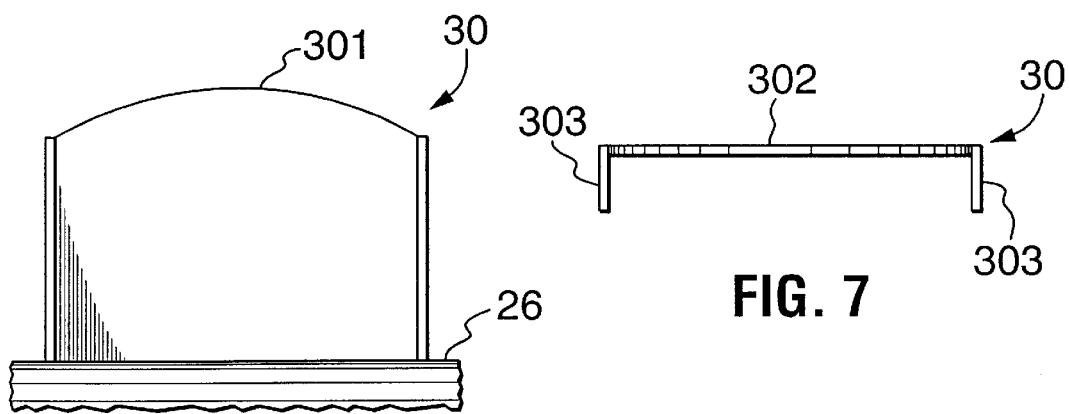
FIG. 6
FIG. 7

CROP MATERIAL PROCESSOR

FIELD OF THE INVENTION

The present invention relates generally to a crop material processor and more particularly to a crop material processor for disintegrating baled crop materials.

BACKGROUND OF THE INVENTION

Crop materials, such as straw, hay or other like forage, or animal bedding, are often baled for storage and transportation. In some instances, it is necessary to break the bale apart in order to spread the crop material for animal bedding or to dispense the crop material as feed.

A machine to disintegrate bales of crop material is sometimes known as a baled crop material processor. A typical machine is described in U.S. Pat. No. 4,830,292 which issued to Frey on May 16, 1989. A baled crop material processor basically comprises a container for receiving the bales, a disintegrator often in the form of a roller with cutters or flails for chopping or shredding the material from the bale, a mechanism including manipulator rollers to direct the bale to the disintegrator and a discharge slot such that the crop material is discharged from the bail processor. Any number of manipulator rollers are possible, however, the disintegrator is located between and below two of the manipulator rollers. The baled crop material is supported and rotated by the rollers. As the crop material bale rotates the disintegrator breaks apart the outer portion of the baled crop material first and then proceeds to break apart the crop material towards the centre of the bale until the crop material is completely broken apart. As the baled crop material is disintegrated, the loose crop material is driven by the flails to be discharged from the machine through the discharge slot. The discharged crop material can be formed into windrows or discharged into feed bunks to be used as feed or it may be scattered to be used as animal bedding.

One of the major problems which appears to occur with baled crop material processors is that they tend to jam. This occurs when loose crop material wraps around the manipulator rollers or passes between the manipulator rollers and the walls of the container. Jams are generally dislodged by reversing the direction of rotation of the manipulator rollers. It has been found that jamming rarely occurs when the bale is firm, the result being that the only loose crop material that is produced, is by the disintegrator in the disintegrator opening between the manipulator rollers; this loose crop material is immediately driven out of the processor through the discharge slot. Loose crop material may be created by the manipulator rollers themselves, the rotation of the bale may shake it apart or the engaging action of the rollers may tear or break the crop material bale apart.

Usually, as the crop material bale rotates, the amount of crop material disintegrated is not uniform from the outside to the inside of the crop material bale. This occurs because the outside is usually much harder than the inside, that is the inside is more loosely baled. Thus, when the exterior of the crop material bale is being disintegrated, that is at the start of the process, the crop material bale is hard. Rotating a hard crop material bale is relatively easy, and therefore uniform disintegration takes place along the periphery of the crop material bale. Furthermore, the crop material bale only breaks apart in the area of disintegration, the other parts of the periphery remain intact due to the hardness of the bale. However, once the softer, inner core of the crop material is reached, the crop material bale is often too loose to remain intact. Therefore, the softer, inner core is sometimes difficult to rotate. The softer inner core tends to break apart because of the rotation, and this loose crop material can cause jamming and impede rotation of the manipulator rollers.

Also, the teeth on the manipulator rollers engage the crop material bale to effect the rotation. This engaging action tends to grab the crop material bale. This grabbing action can be very similar to the disintegration action, and hence loose crop material can be created. Furthermore, the grabbing action may not release the crop material bale and hence pull the crop material around the roller causing a wrap around situation.

Moreover, if the crop material bale moves longitudinally and impacts the front or back wall of the container, then the crop material may be torn from the bale by the wall or the rotation of the crop material bale may be impeded by the contact with the wall of the container. Often, the result of this impeded rotation is that the teeth of the manipulator rollers tend to break the crop material bale apart, and this crop material may jam the roller, which is undesirable.

A further difficultly is to control bales of irregular shape such as rectangular bales, frozen bales or bales that have been stored for a period of time and are flat on one side. Sometimes, irregularly shaped bales can cause a jam to occur since they do not rotate properly.

For the foregoing reasons, there is a need to provide a crop material processor for disintegrating baled crop material capable of keeping to a minimum the amount of loose crop material in the processor that may cause jamming.

SUMMARY OF THE INVENTION

It is therefore an object of this invention to provide a baled crop material processor that minimizes jamming.

These and other objects are achieved in a baled crop material processor for disintegrating baled crop material. The crop material processor comprises a container having a bottom, a front wall, a back wall, and left and right side walls for receiving and containing the crop material. A disintegrator having a flail roller that is rotatable about its own longitudinal axis is mounted to extend between the front and the back of the container. A number of flails are pivotally fixed about the flail roller such that they will extend radially from the flail roller as the flail roller rotates. The processor further includes a discharge opening at the bottom of either the left or the right side wall to discharge the disintegrated baled crop material and a mechanism for supporting and manipulating the baled crop material so that it will be moved to the disintegrator in such a manner that disintegration of the baled crop material is carried out primarily by the disintegrator.

In accordance with an aspect of this invention, the processor may be unidirectional, discharging the disintegrated crop material either to the left or to the right of the processor, or the processor may be bidirectional with a mechanism for allowing the operator to discharge from the left or the right. The direction of rotation of the flail roller will depend on the side of the processor that discharge is desired. The flail roller will rotate in the counter-clockwise direction for discharge to the left and in the clockwise direction for discharge to the right.

In accordance with another aspect of the invention, the support and manipulation mechanism includes at least two manipulator rollers rotatably mounted inside the container substantially parallel to the flail roller wherein at least one roller is located on each side of the flail roller to define a disintegration opening where crop material is accessed by the disintegrator. The cross-section of the manipulator rollers may be substantially square. A number of paddles that are channel shaped with a projecting end that is curved outwardly are mounted about each of the rollers. The paddles are positioned such that the plane of the paddles is at an angle θ to a plane through the axis of the manipulator roller, where 0≦θ≦90° and may be in the order of 45°.

With regard to a particular aspect of this invention, the lead surface of the paddles are made to face in different directions. In particular, the lead surface of the paddles at the front of the processor face towards the back of the processor, and the lead surface of the paddles at the back of the processor face towards the front of the processor.

With regard to another aspect of the invention, the processor includes a mechanism for connection between the processor flail roller and the a source of rotating power to assure that the flail roller rotates in the desired direction. In particular for a bidirectional processor, the direction of rotation may be switched from one to the other.

In accordance with another aspect of this invention, each of the side walls are shaped to form a protrusion into the container in close proximity to the paddles of the manipulator rollers. Each of the side walls also has a substantially vertical wall portion below the protrusions and a wall portion sloping outwardly from above the protrusion.

The support mechanism further includes a number of hoops mounted in spaced relationship within the container along the container length and positioned above and substantially perpendicular to the flail roller and the manipulator rollers.

Another particular aspect of the present invention is exemplified in the flails that are mounted on the flail roller, each flail comprises a bar with one end having at least one prong with a bevelled edge and the other end having a hollow cylindrical section to receive a bolt for pivotally mounting the flail to the flail roller.

Many other objects and aspects of this invention will be clear from the detailed description of the drawings

BRIEF DESCRIPTION OF THE DRAWINGS

Embodiments of the invention are described in the drawings in which:

FIG. 4 is a side view of the flail in accordance with the present invention;

FIG. 5 is a front view of the flail in FIG. 4;

FIG. 6 is a back view of the manipulator paddle in accordance with the present invention;

FIG. 7 is the top view of the manipulator paddle in FIG. 6;

DETAILED DESCRIPTION

By way of overview, the present description will include the structure of the crop material processor, the operation of the crop material processor and the advantages of the crop material processor in accordance with the present invention in that order.

Figure 1:
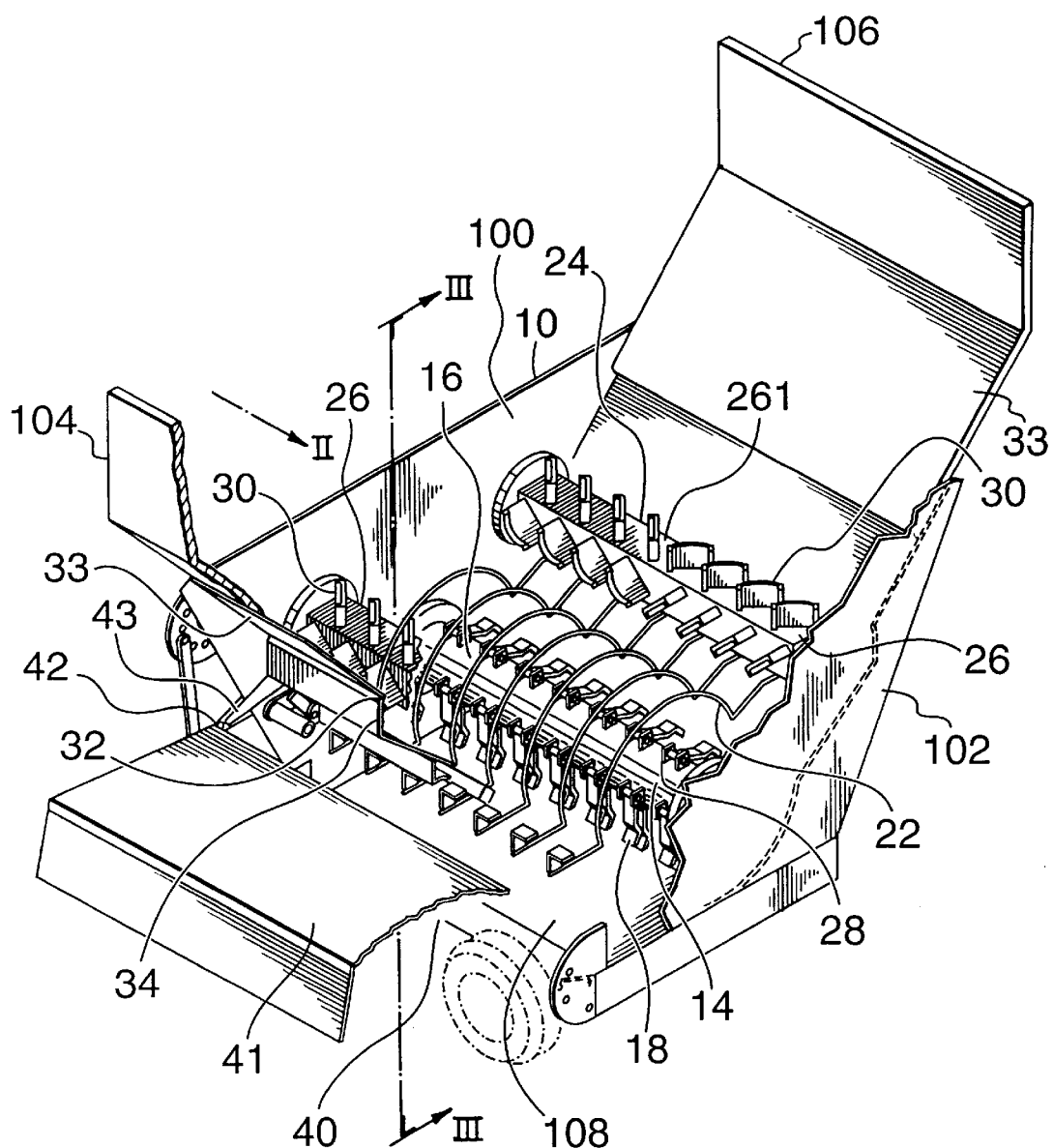
FIG. 1 is an isometric view of an embodiment of the invention.
Figure 2:
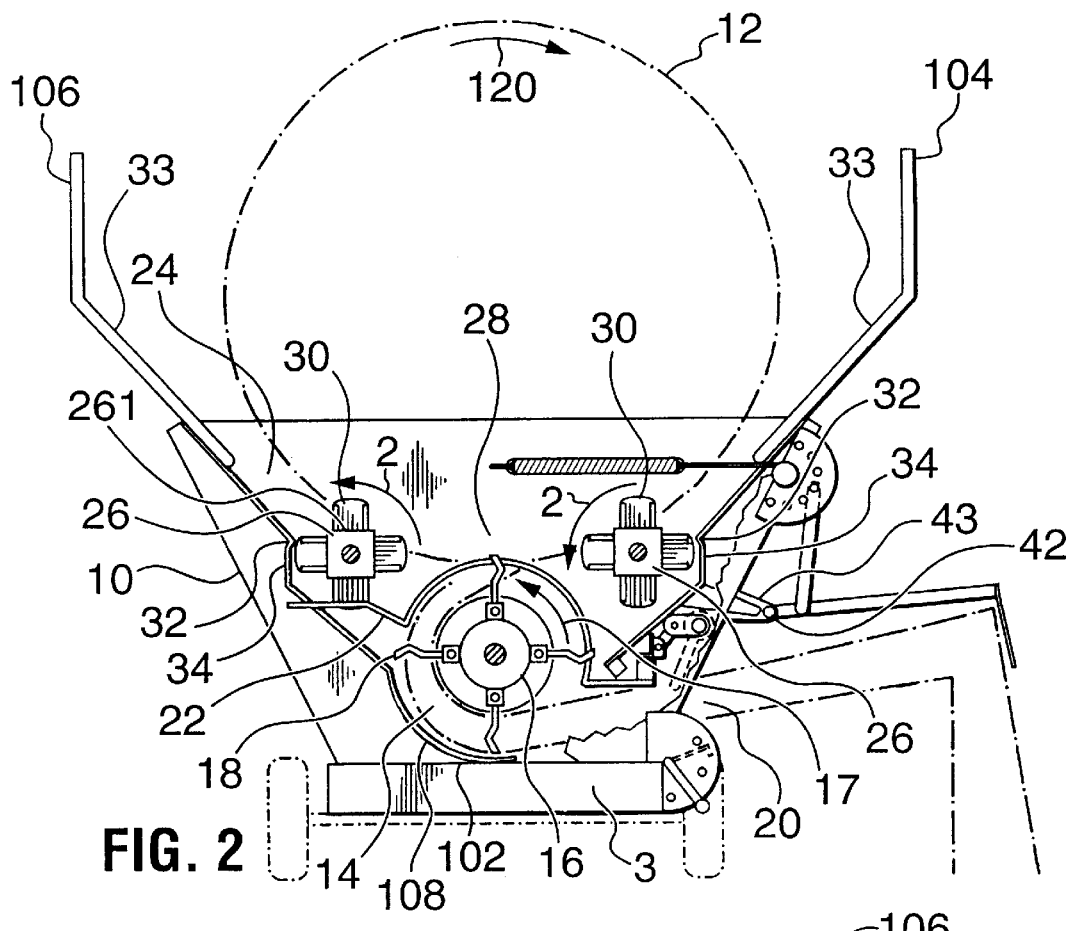
FIG. 2 is a partial cross-sectional view of the embodiment shown in FIG. 1, viewed in the direction indicated by II.
Figure 3:
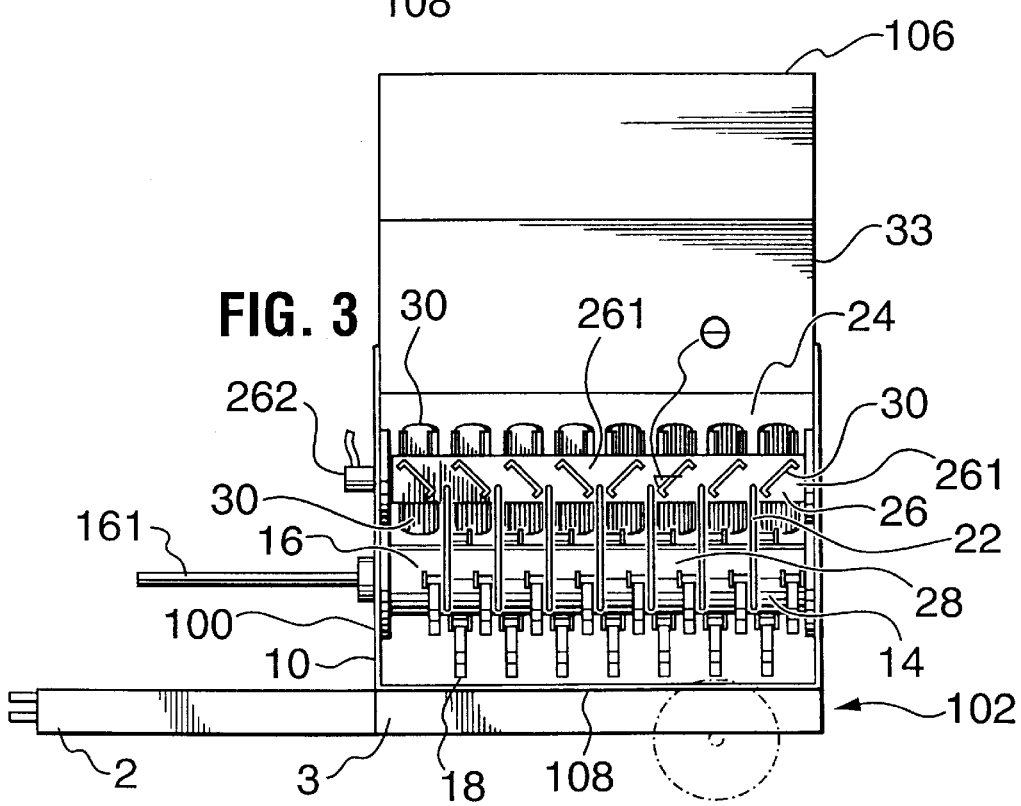
FIG. 3 is a cross-sectional view taken along lines III of the embodiment shown in FIG. 1.

The baled crop material processor 1 in FIGS. 1, 2 and 3 is built on a chassis 3 that has a hitch 2 fixed to it for pulling the processor 1 by another machine, usually a tractor. Power to the baled crop material processor 1 is usually in the form of a power take-off and hydraulics that is provided by the tractor.

The baled crop material processor includes a container 10 that is mounted on the chassis 3 into which bales of crop material 12 are loaded. The crop material 12 may be any type of hay, straw or other forage that can be used as feed or bedding for animals. The container 10 includes a front wall 100, a back wall 102, two sidewalls 104, 106 and a bottom 108. The front wall 100 of the container 10 is closest to the tractor, the back wall 102 is farthest from the tractor. The left side wall is identified as wall 104, while the right side wall is identified as wall 106.

Mounted inside the container 10 is a disintegrator 14 that includes a flail roller 16. The flail roller 16 extends between the front wall 100 of the container 10 and the back wall 102 of the container 10, normally along its entire length. The flail roller 16 is mounted on bearings fixed to the front and back walls 100 and 102 respectively so as to be rotatable about its longitudinal axis. An input shaft 161 for connection to the tractor power take-off is connected to the flail roller 16 to rotate it under the control of the tractor. The power take-off on most tractors rotates in only one direction, that being counter-clockwise when looking back from the tractor, thus the flail roller 16 of the disintegrator 14 will rotate in the counter-clockwise direction when looking at it from the front wall 100 as shown by the arrow 17.

The disintegrator 14 further comprises a number of flails 18 pivotally mounted on the flail roller 16. The flails 18 are intermittently spaced along the length and around the circumference of the roller 16. A flail 18 is illustrated in side view in FIG. 4 and in front view in FIG. 5. Flail 18 comprises a solid metal bar 180 having a rectangular cross-section in this embodiment which is reverse bent at point 181 and 182. One end 183 of the bar is welded to a hollow cylindrical section 184 for pivotally mounting by a bolt 185 to two supports 186 that are welded to the roller 16. The other end 187 of the bar 180 is bevelled to provide a cutting or tearing edge 188. The reverse bend in the bar 180 allows it to lay close to the roller 16 when on its back; the cutting edge 188 faces away from the roller 16.

A discharge opening 40 is located at the bottom of the side walls 104 of the container 10 which in this case is the left side wall. The discharge opening 40 is formed by wall 104, the bottom 108 and the end walls 100 and 102 such that the flails 18 on the flail roller 16 drive the shredded crop material along the bottom 108 to discharge it from the processor 1. In addition, a discharge door 41 is hinged at 42 to an extension 43 from the side wall 104 such that it may be raised or lowered to guide the shredded bale material as it is discharged. When the discharge door 41 is raised, the discharged material will be spread over a wide area; when the discharge door 41 is lowered, the discharged material will form a windrow as the machine 1 moves; and when the discharge door 41 is in an intermediate position, the discharged material can be directed into a feed bunk.

The baled crop material processor 1 further includes means 24 for manipulating the crop material 12 such that it will be disintegrated by the disintegrator 14, the purpose of the manipulation means 24 is to maintain the crop material 12 substantially intact for disintegration primarily by the disintegrator 14.

The manipulation means 24 comprises at least two rollers 26 rotatably mounted inside the container 10 parallel to and above the flail roller 16. Each roller 26 extends between the front wall 100 and the back wall 102 of the container 10. Each roller 26 is rotatable about its own longitudinal axis in either direction usually by a hydraulic motor 262, though electrical motors may also be used. A pair of rollers 26, one on each side of the flail roller 16, defines a disintegration opening 28 where crop material 12 is presented to the disintegrator 14. In this particular embodiment, the cross-section of the rollers 26 is substantially square having flat surfaces 261 however, it may also be round. In order to rotate the bale 12 in a clockwise direction which is the preferred direction, both rotors 26 are made to rotate in a counter-clockwise direction. In addition to rotating the baled crop material, the rollers 26 define a support surface on which the crop material 12 is supported.

Further, a number of paddles 30 are mounted longitudinally along each side 261 of each of the rollers 26. The paddles 30 project substantially perpendicular to the roller surfaces 26. As illustrated in FIGS. 6 and 7, the projecting end 301 of the paddles 30 is curved outwardly. The paddles 30 are channel shaped to define a front surface 302 with flanges 303 at the back for reinforcement.

When mounted in a spaced relationship on each side of the rollers 26, the paddles 30 are positioned at an angle θ relative to a plane through the axis of roller 26 that is perpendicular to the side 261. In addition, the front side of the paddles face the direction of rotation. The angle θ is more than 0° and less than 90°, and is preferably in the order of 45 degrees. Half of the paddles 30 closest to the front wall 100 of the container 10 are angled such that they face towards the back wall 102, while the other half of the paddles 30 closest to the back wall 102 of the container 10 are angled such that they face towards the front wall 100. The front half of the paddles 30 are positioned in a substantially mirror image configuration relative to the back half of the paddles 30.

The manipulation means 24 further includes the side walls 104, 106 of the container 10 to support the bale in the container. In addition, one or both side walls 104 and 106 are adapted to be in close proximity to the curved edge 301 of the paddles 30. The preferred profile for the walls 104 and 106 is illustrated in FIG. 2 wherein the walls 104 and 106 include a protrusion 32 projecting into the container 10 proximal to the support surface 261 defined by the rollers 26. The side walls 104 and 106 further have a substantially vertical wall portion 34 located below the protrusion 32 and a wall portion 33 sloping outwardly from above the protrusion 32.

Also mounted inside the container 10 are a number of hoops 22 which prevent the bale or bundles of loose crop material from dropping into the disintegrator 16 all at once. The hoops 22 are mounted between the sidewalls 104 and 106 of the container 10 and are spaced so that the flails 18 and the paddles 30 pass between the hoops 22 as the roller 16 and the rollers 26 rotate.

Figure 8:
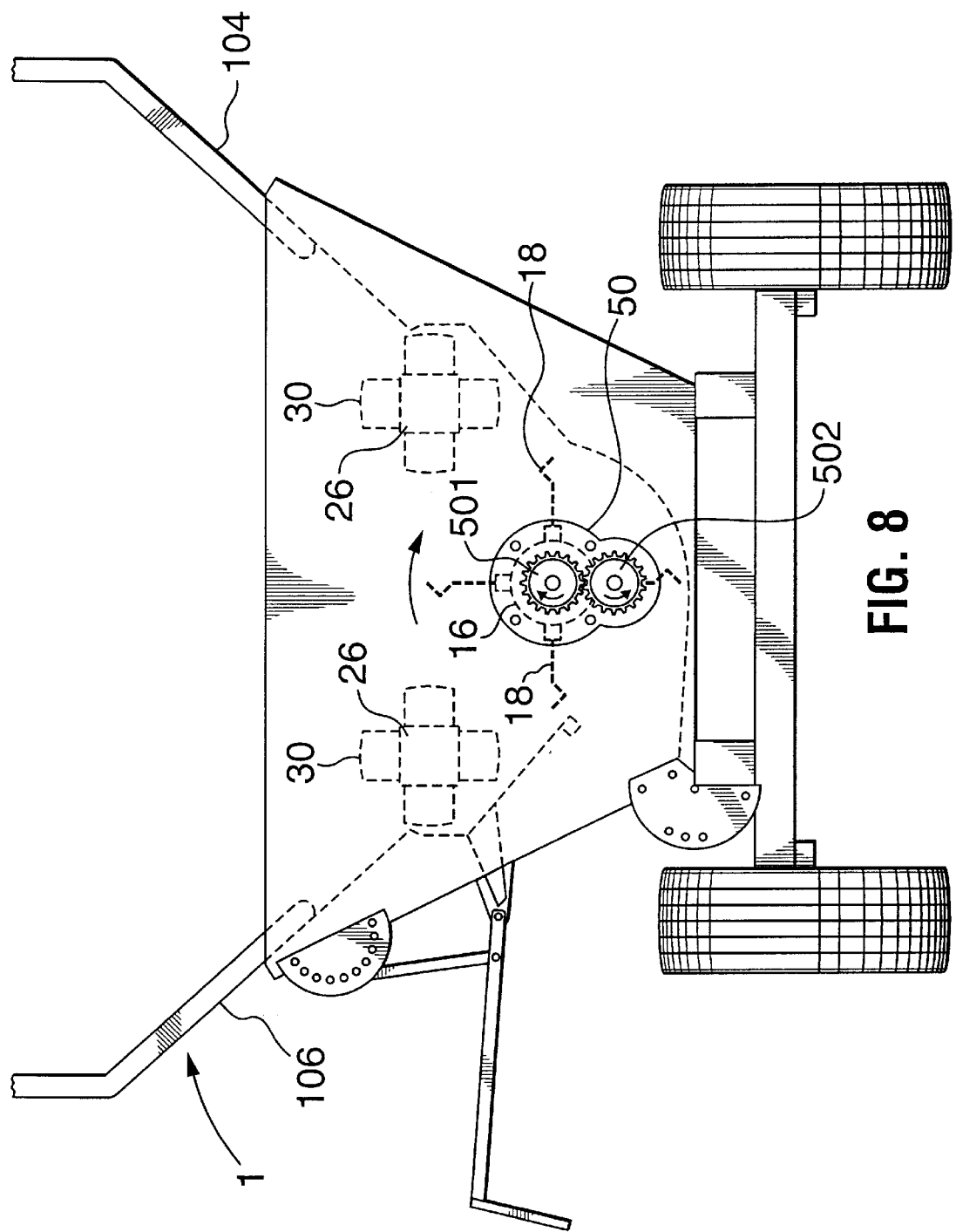
FIG. 8 is an embodiment of the processor in accordance with the present invention to provide an alternate rotation direction for the flail roller.

Though the embodiment of the baled crop material processor 1 has been described as discharging the disintegrated bale crop material to the left of the processor 1, it is within the scope of the present invention to provide a processor 1 from which the disintegrated bale crop material is discharged from the right of the processor 1 as illustrated in FIG. 8. The construction of such a machine would be the mirror image of the machines described with respect to FIGS. 1 to 3. In this embodiment, the flail roller 16 would be made to rotate in a clockwise direction and the flails 18 would be mounted on the roller 16 facing in the direction of rotation. In addition, the manipulator rollers 26 would continue to be rotatable in either direction, though clockwise would be their preferred direction of rotation. The paddles 30 on the rollers 26 would be mounted facing the direction of preferred rotation. Finally, the discharge opening would be located on the right wall 106.

Figure 9:
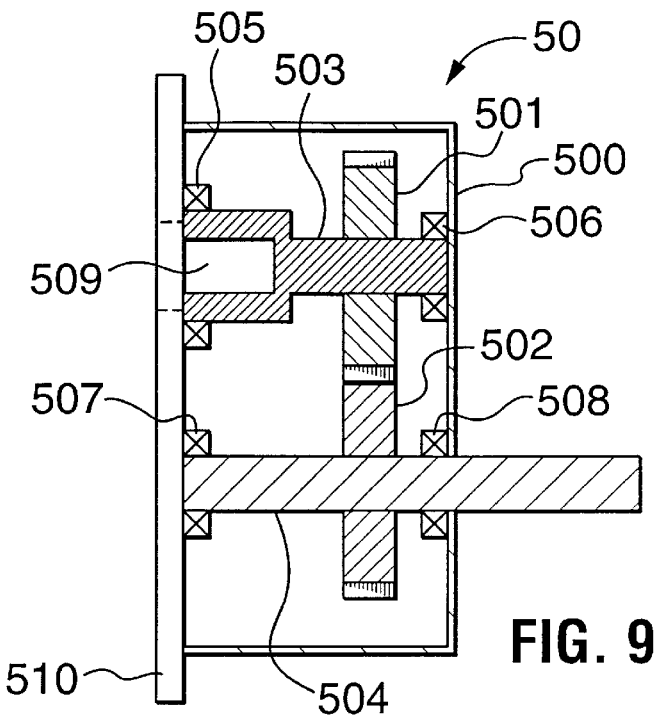
FIG. 9 illustrates a gear box used with the present invention.

As indicated above, many tractors are unable to provide a power take-off that rotates in a clockwise direction. Thus, the baled crop processor 1 in the embodiment in FIG. 8 further includes a gearbox 50 for converting the counter-clockwise rotation of the power take-off to a clockwise rotation required by the flail roller 16. As illustrated in FIG. 9, the gearbox 50 includes a enclosed housing 500 for an oil bath and a flange 510 for mounting the gear box to the front wall 100 of the processor 1. Two gears 501 and 502 fixed to shafts 503 and 504 are rotatably mounted within the housing by bearings 505, 506 and 507, 508 respectively. Gears 501 and 502 would normally provide a 1 to 1 ratio, but other ratios could be used. Shaft 503 includes a female input 509 to receive the shaft of the flail rotor 16. Shaft 504 has an extension 511 outside of the housing 500 to which the power take-off shaft is connected through a universal joint coupler. When the power take-off shaft 161 rotates in its normal counter-clockwise direction, the flail roller 16 will rotate in the clockwise direction as shown in FIG. 8.

Though a particular gearbox has been shown, other gearboxes with or without clutches, belts or chains may also be used to provide rotation reversal. In addition, under certain conditions, it might be preferable to drive the flail roller using a hydraulic motor. As most tractors do not have sufficient hydraulic capacity for such a motor, a hydraulic motor/power take-off pump configuration would be used. A hydraulic motor provides the advantage of being able to rotate the flail roller in either direction.

Figure 10:
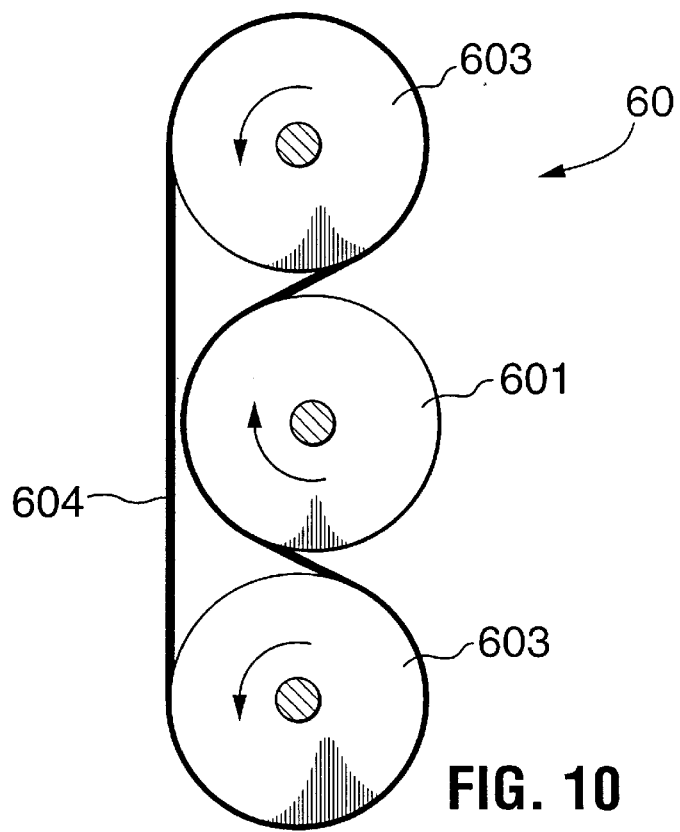
FIG. 10 illustrates a belt/chain pulley arrangement.

FIG. 10 schematically illustrates an arrangement 60 of belt or chain driven pulleys that can provide a clockwise rotation to the flail roller from a power take-off turning in the counter-clockwise direction. In FIG. 10, pulleys 601, 602, and 603 are fixed relative to one another. Pulley 601 is connected to the flail roller 16, pulley 602 is adapted to be connected to the power take-off shaft 161 and pulley 603 acts as an adjustable idle pulley. A belt or a chain is mounted about the pulleys as shown and tightened by pulley 603. As the pulley 602 is driven in the counter-clockwise direction by the power take-off, pulley 602 will rotate in the clockwise direction.

Figure 11:
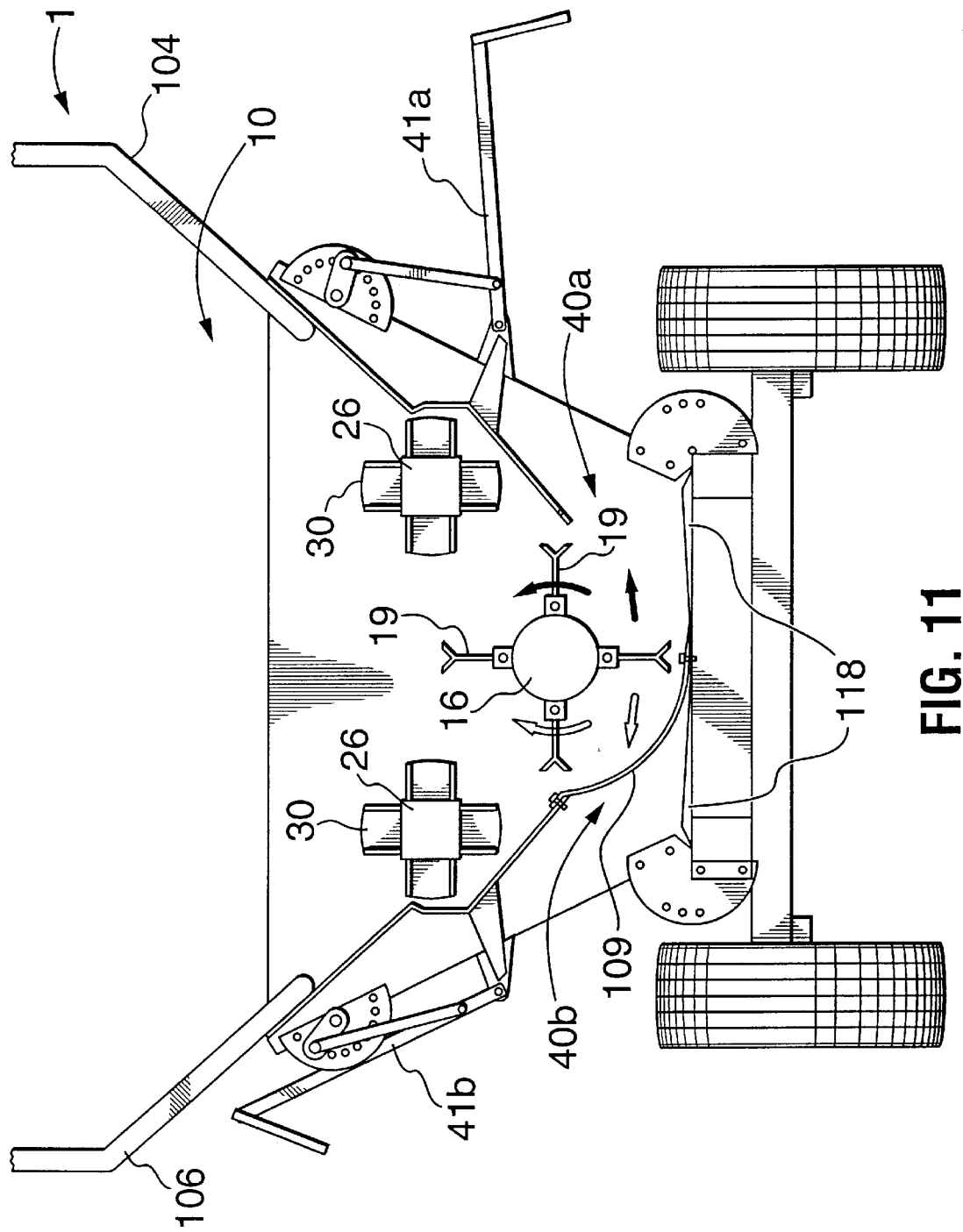
FIG. 11 illustrates a bidirectional discharge processor in accordance with the present invention.
Figure 12:
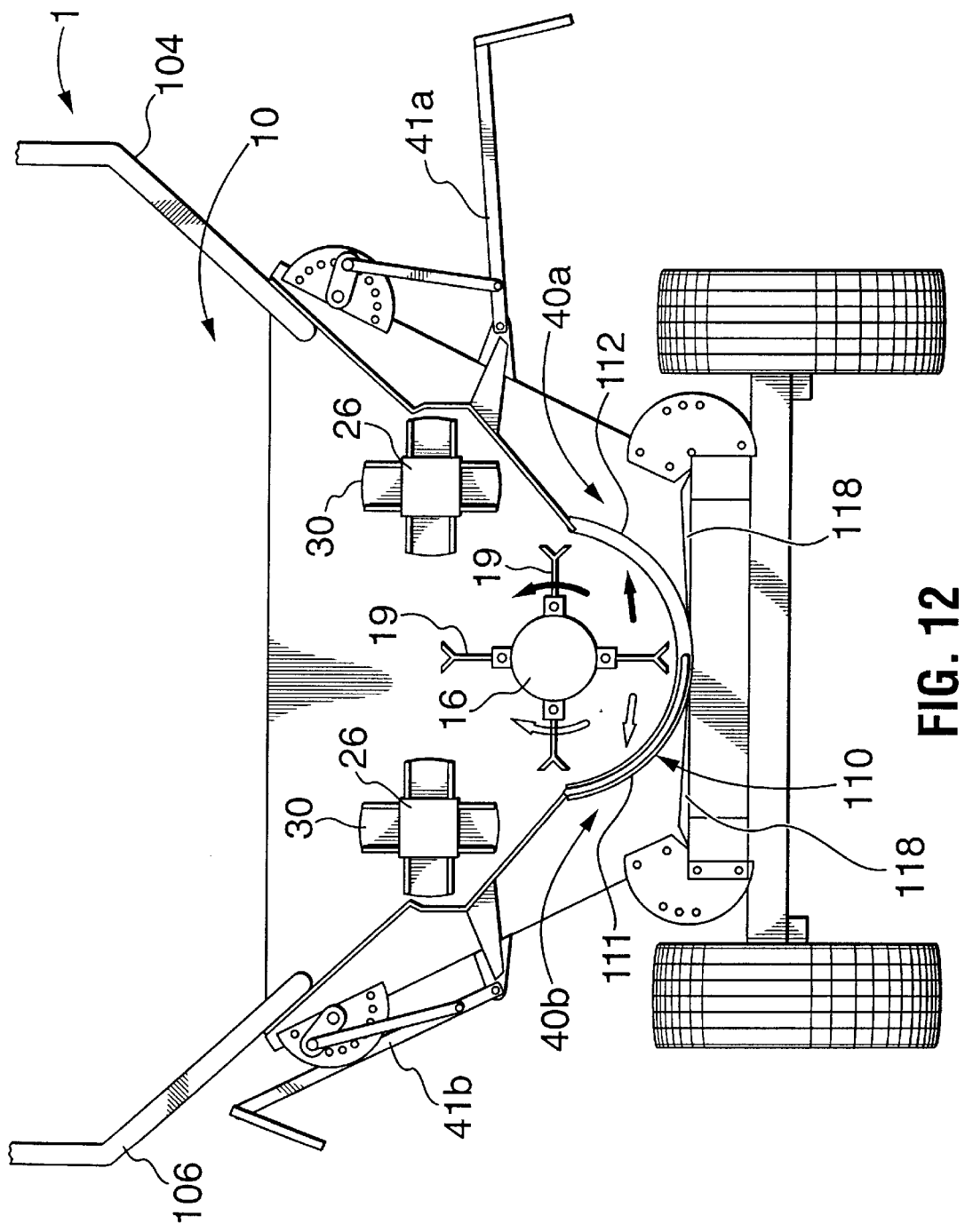
FIG. 12 illustrates a further embodiment of a bidirectional discharge processor in accordance with the present invention.

FIGS. 11 and 12 illustrate in cut away view, embodiments of a baled crop material processor 1 where the operator can decide whether the disintegrated crop material is to be discharged from the left side or the right side of the processor 1. The processor 1 is similar to the processors described with regard to FIGS. 1, 2, 3 and 8 in that it includes a container 10 with side walls 104 and 106, a front wall 100 (cut away), a back wall 102 and a base plate 118. The processor further includes a flail roller 16 with flails 19, and at least two manipulator rollers 26 with paddles 30.

Figure 13:
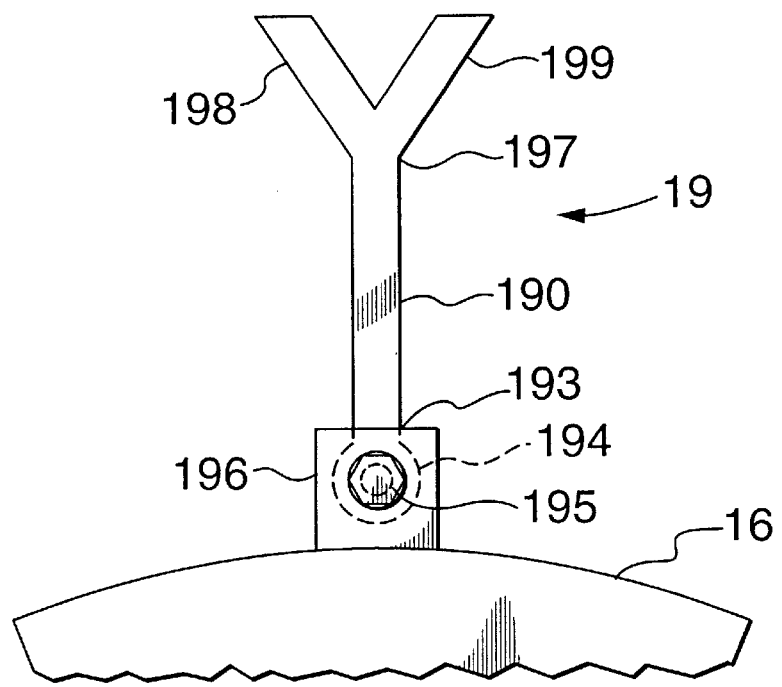
FIG. 13 illustrates a flail for a bidirectional discharge processor.

However, it would be preferable to use bidirectional flails 19 of the type shown in FIG. 13. Flail 19 comprises a solid metal bar 190 having a rectangular cross-section. One end 193 of the bar 190 is welded to a hollow cylindrical section 194 for pivotally mounting by a bolt 195 to two supports 196 that are welded to the roller 16. The other end 197 of the bar 190 is forked tc provide two bevelled prongs 198 and 199 that each provide a cutting or tearing edge. The prongs provide for a cutting or tearing edge for each rotation direction of the roller 16.

The processor further includes optional left and right discharge openings 40a and 40b respectively. The left discharge opening 40a is located at the bottom of the side wall 104 of the container 10 whereas the right discharge opening 40b is located at the bottom of the right side wall 106. In FIG. 11, discharge opening 40a is formed by wall 104, the end walls 100 and 102 and a moveable bottom wall 109 that is bolted in place such that the flails 19 on the flail roller 16 rotating counter-clockwise drive the shredded crop material along the bottom wall 109 and the base plate 118 to discharge it from the processor 1 to the left. Alternately, the moveable bottom wall may be bolted between the side wall 104 and the base plate 118 such that the discharge opening 40b is formed by wall 106, the end walls 100 and 102 and a moveable bottom wall 109 such that the flails 19 on the flail roller 16 rotating clockwise drive the shredded crop material along the bottom wall 109 and the base plate 118 to discharge it from the processor 1 to the right. In FIG. 12, the moveable bottom wall 110 comprises a curved plate 111 slidably mounted within curved channels 112. The moveable bottom wall 110 can be slid to be in contact with wall 106 to form discharge opening 40a with side wall 104 and the end walls 100 and 102 such that the flails 19 on the flail roller 16 rotating counter-clockwise drive the shredded crop material along the curved plate 111 and the base plate 118 to discharge it from the processor 1 to the left. Alternately, the curved plate 111 may be slid to be in contact with the side wall 104 such that the discharge opening 40b is formed by wall 106, the end walls 100 and 102 and a moveable bottom wall 111 such that the flails 19 on the flail roller 16 rotating clockwise drive the shredded crop material along the curved plate 111 and the base plate 118 to discharge it from the processor 1 to the right.

In addition, the processor includes two discharge doors 41a and 41b. Each discharge door 41a, 41b. is hinged at 42a, 42b to an extension 43a, 43b from the side walls 104 and 105 respectively such that when in use they may be raised or lowered to guide the shredded bale material as it is discharged, and when not in use they may be raised to a rest position. When the discharge door 41a, 41b is raised, the discharged material will be spread over a wide area; when the discharge door 41a, 41b is lowered, the discharged material will form a windrow as the machine 1 moves; and when the discharge door 41a, 41b is in an intermediate position, the discharged material can be directed into a feed bunk.

Figure 14:
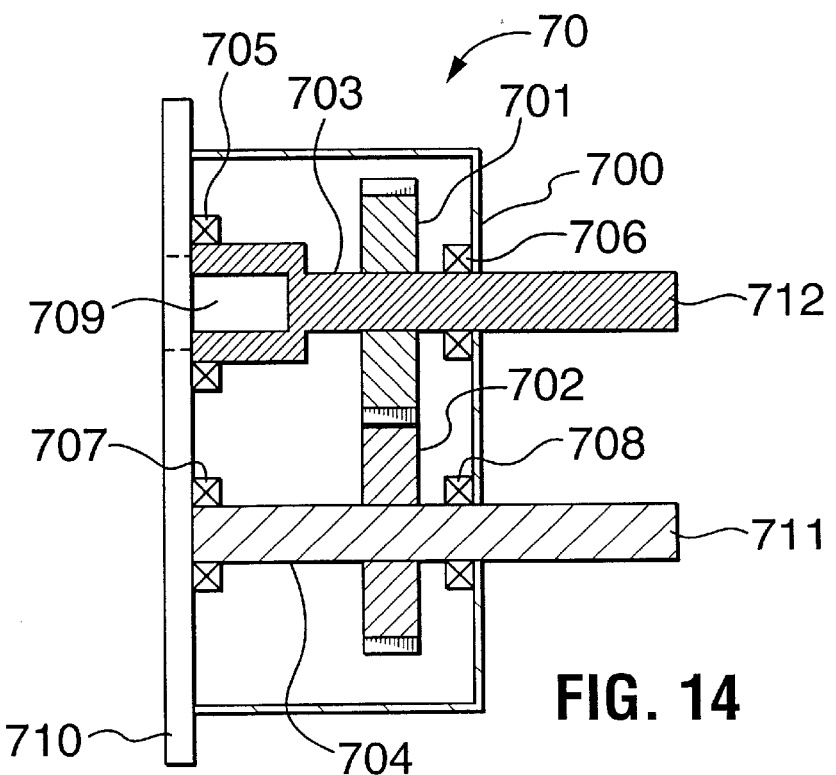
FIG. 14 illustrates a gear box for a bidirectional discharge processor.

As illustrated in FIGS. 11 and 12, it is desirable to be able to rotate the flail roller 16 in either direction. This may be accomplished by a tractor having a controllable power take-off that may be rotated in either direction. Then again, a hydraulic motor/power take-off hydraulic pump arrangement could be used. However, a further embodiment for providing alternate rotation direction from a unidirectional power take-off is illustrated in FIG. 14. A gearbox 70 similar to the one illustrated in FIG. 9 can convert the counter-clockwise rotation of the power take-off to a clockwise rotation that is applied to the flail roller 16 or it can apply the counter-clockwise rotation of the power take-off directly to the flail roller 16. The gearbox 70 includes a enclosed housing 700 for an oil bath and a flange 710 for mounting the gear box 70 to the front wall 100 of the processor 1. Two gears 701 and 702 fixed to shafts 703 and 704 are rotatably mounted within the housing by bearings 705, 706 and 707, 708 respectively. Gears 701 and 702 would normally provide a 1 to 1 ratio, but other ratios could be used. Shaft 703 includes a female input 709 to receive the shaft of the flail roller 16. Shaft 704 has an extension 711 outside of the housing 700 to which the power take-off shaft can be connected through a universal joint coupler. Shaft 703 also has an extension 712 outside of the housing 700 to which the power take-off can be connected. When the power take-off shaft 161 is connected to extension 711 and rotates in its normal counter-clockwise direction, the flail roller 16 will rotate in the clockwise direction, however the operator has the option of connecting the power takeoff shaft 161 to extension 712 to make the flail roller 16 rotate in the counterclockwise direction. Similarly the pulley system illustrated in FIG. 10 can be converted to a bidirectional pulley system by extending the shaft on pulley 601 for connection to the power take-off.

Turning now to the operation of the crop material processor, reference to FIGS. 1 to 14 is still made throughout.

The crop material 12 is generally in the form a bale, usually round, of some type of forage such as straw or hay. The crop material 12 is loaded into the container 10 onto the rollers 26 and the hoops 22. The orientation of the crop material 12 as it is placed inside the container 10 does not matter. In addition to supporting the crop material 12, the purpose of the rollers 26 is to rotate the crop material 12 so that there is always some portion of it available for disintegration by the flails 18. If the crop material 12 had no support, the flails 18 would cut a tunnel in the crop material 12 and jam. The walls 104 and 106 of the container 10 also support the crop material 12. The slope of the sidewalls 104 tend to support the crop material 12 if it falls apart into loose crop material, as well as to enhance the turning of an irregularly shaped bail. Bales are often irregularly shaped, for example, round bails often have a flat side from sitting in the field.

As the rollers 26 rotate the baled crop material 12 in either direction, the flail roller 16, located near the bottom 108 of the container 10, disintegrates the crop material 12 by the extended rotating flails 18. The flails 18 grasp some of the crop material 12 and drive the loosened crop material 12 to the discharge slot 40 where the disintegrated crop material 12 exits the crop material processor 1. It is preferred to rotate the bale in the clockwise direction as shown by arrow 120 in FIG. 2 when the flail roller 16 is rotating in the counter-clockwise direction, ie the flails 18 and the bale 12 are moving in the same direction at their point of contact. For smooth operation it is always preferred to have the bale 12 and the flail roller 16 rotating in opposite directions.

In accordance with the present invention, the manipulation means 24 which includes rollers 26 and walls 104 and 106 combine to control the baled crop material 12 so that the disintegration is performed primarily by the flails 18.

The curved paddles 30 on rollers 26 rotate the crop material 12 without substantially breaking the crop material 12 apart. The leading corner 303 of the curved paddle 30 grasps the crop material 12 and rotates it and the curved upper surface 301 tends to pull the paddle 30 out of the crop material 12 as the rollers 26 are rotated. If the paddle 30 were to continue grasping the crop material 12, the paddle 30 would tend to pull the crop material apart and loose crop material could wrap around the roller 26 and/or be pulled between the side walls 104, 106 and the rollers 26, this could contribute to jamming. Therefore, the crop material 12 is maintained substantially intact while being rotated.

Further, the angled paddles 30 tend to guide the crop material 12 longitudinally toward the centre of the crop processor 1, that is away from the end walls 100 and 102. Therefore, the end walls 100 and 102 are less likely to impede the rotating crop material 12 and cause the rollers 26 or the end walls 100 and 102 from breaking apart the crop material.

Moreover, the shape of the sidewalls 104 and 106 of the container 10 further enhance the of the manipulation means 24. Since the paddles 30 are in close proximity to the walls 104, 106 due to the protrusion 32, loose crop material tends to be prevented from passing between the walls 104, 106 and the rollers 26. If a small amount of crop material 12 does pass by the protrusion 32, the vertical portion 34 allows for a gap so that the small amount of crop material 12 can readily pass under the roller 26 so as to not jam the crop material processor 1. Furthermore, the sloped portion 33 of the sidewalls 104, 106 tends to allow any loose crop material 12 to be carried up, away from the roller 26.

The direction of rotation of flail roller 16 in conjunction with the shape of the bottom 108 (FIGS. 2 and 8) or the moveable bottom 109, 111 with base plate 118 (FIGS. 11 and 12) provides for a continuous flow of the crop material from the time that it is disintegrated by the flails 18, 19 to the time that it is discharged from the processor 1 either to the left or to the right.

The previously described embodiments of the present invention provide for many advantages, including the following.

The curved paddles 30 contribute to the rotation of the baled the crop material 12 without breaking the bale apart. The angled paddles 30 guide the baled crop material 12 to remain centred within the length of the container 10. The paddles 30 which are reinforced by their channel shape allow for aggressive rotation of the baled crop material 12.

The square cross-section of the rollers 26 offers greater support and allows for more aggressive rotation of the baled crop material 12. Further, square rollers 26 may be more readily manufactured and the base of the paddles 30 can be flat for mounting.

The shape of the side walls 104, 106 tends to prevent passage of loose material between the walls 104, 106 and rollers 26 guiding the loose material upward and away from the rollers 26 while at the same time allowing material falling by the walls 104, 106 to drop away freely. In addition, the falling loose material will fall into the flow of the material being discharged from the processor 1. All of these contribute to the overall advantage of preventing jams within the processor 1.

The ability to reverse the direction of rotation of rollers 26 is also advantageous since it provides a mechanism for unjamming a processor 1 particularly in the areas of the rollers 26 or if the baled crop material 12 refuses to rotate in any particular direction.

A processor 1 which discharges the disintegrated baled crop material from the right of the processor 1 is particularly advantageous in that it allows the operator to more adequately and comfortably control the operation. Most tractors have their controls located on the right hand side of the tractor and so it is more natural and common for the operator to observe the operation of the farm equipment behind him by turning to the right. The bidirectional processor 1 (FIGS. 11 and 12) provides the operator total versatility since it allows the operator to discharge the disintegrated baled crop material in any way desired.

A further advantage of the invention is that the flails 18 cut the twine that ties the crop material bale 12 together. The cut twine usually wraps around the flail roller 16 during the operation of the crop processor 1. The operator does not have to cut the twine around the crop material bale 12 before loading and needs only to remove the twine from the flail roller 16 before an amount of twine accumulates and impedes the operation of the crop processor 1.

Many modifications to the above described embodiments of the invention can be carried out without departing from the scope thereof, and therefore the scope of the present invention is intended to be limited only by the appended claims.

What is claimed is:

1. A crop material processor for disintegrating baled crop material comprising:

a container for receiving and containing the crop material, the container having a bottom, a front wall, a back wall, a left side wall and a right side wall;

a disintegrator mounted inside the container comprising:
a flail roller extending between the front of the container and the back of the container and mounted to rotate about its own longitudinal axis; and
a number of flails pivotally mounted about the flail roller and extending radially from the flail roller as the flail roller rotates;

a discharge opening at the bottom of one of the side walls; and means for supporting and manipulating the crop material for disintegration primarily by the disintegrator.

2. A crop material processor as claimed in claim 1, wherein the support and manipulation means comprises:

at least two manipulator rollers rotatably mounted inside the container substantially parallel to the flail roller wherein at least one roller is located on each side of the flail roller to define a disintegration opening where crop material is accessed by the disintegrator; and a number of paddles mounted about each of the rollers, the paddles projecting outwardly from the rollers.

3. A crop material processor as claimed in claim 2, wherein the cross-section of the manipulator rollers is substantially square.

4. A crop material processor as claimed in claim 2, wherein the paddles have a projecting end curved outwardly.

5. A crop material processor as claimed in claim 4, wherein the paddles are channel shaped.

6. A crop material processor as claimed in claim 4, wherein the paddles are positioned such that the plane of the paddles is at an angle θ to a plane through the axis of the manipulator roller, where $0 \leq \theta \leq 90°$.

7. A crop material processor as claimed in claim 6, wherein the angle θ is in the order of 45 degrees.

8. A crop material processor as claimed in claim 6, wherein the lead surface of the paddles face in different directions.

9. A crop material processor as claimed in claim 8, wherein the lead surface of approximately half of the paddles face in a first direction and the lead surface of the remaining paddles face in a second direction.

10. A crop material processor as claimed in claim 9, wherein the first direction is towards the front wall and the second direction is towards the back wall.

11. A crop material processor as claimed in claim 10, wherein paddles on the front half of each manipulator roller are positioned in substantially a mirror image to the paddles on the back half of each manipulator roller.

12. A crop material processor as claimed in claim 2 wherein the support and manipulation means further comprises a protrusion on each side wall projecting into the container in close proximity to the paddles of the manipulator rollers.

13. A crop material processor as claimed in claim 12 wherein each side wall has a substantially vertical wall portion below the protrusion.

14. A crop material processor as claimed in claim 13 wherein a portion of each side wall slopes outwardly from above the protrusion on each side wall.

15. A crop material processor as claimed in claim 1 wherein the support and manipulation means further comprises a number of hoops mounted in spaced relationship within the container along the container length and positioned above and substantially perpendicular to the flail roller and the manipulator rollers.

16. A crop material processor as claimed in claim 1 wherein the flail roller is adapted to rotate such that the disintegrated crop material flows between the flail roller and the container bottom to the discharge opening.

17. A crop material processor as claimed in claim 16 wherein the discharge opening is located at the bottom of the left side wall and the flail roller is adapted to rotate in a counter-clockwise direction.

18. A crop material processor as claimed in claim 16 wherein the discharge opening is located at the bottom of the right side wall and the flail roller is adapted to rotate in a clockwise direction.

19. A crop material processor as claimed in claim 18 wherein the processor further includes rotation conversion means having an input for connection to rotating power source and an output connected to the flail roller to provide a direction of rotation to the flail roller opposite to the direction of rotation at the conversion means input.

20. A crop material processor as claimed in claim 19, wherein the rotation conversion means comprising a first gear and a second gear positioned to drive one another, the first gear being mounted on a first rotatable shaft having an extended end for providing the conversion means input and the second gear being mounted on second rotatable shaft having an end connected to the flail roller.

21. A crop material processor as claimed in claim 1 wherein each flail comprises a bar with one end having at least one prong with a bevelled edge and the other end having a hollow cylindrical section for pivotally mounting the flail to the flail roller.

22. A crop material processor as claimed in claim 21 wherein the flail includes two prongs.

23. A crop material processor for disintegrating baled crop material comprising:

a container for receiving and containing the crop material, the container having a front wall, a back wall, a left side wall, a right side wall and a base plate;
a disintegrator mounted inside the container comprising:
a flail roller extending between the front of the container and the back of the container and mounted to rotate about its own longitudinal axis; and
a number of flails pivotally mounted about the flail roller and extending radially from the flail roller as the flail roller rotates;
closeable discharge openings at the bottom of each of the side walls; and
means for supporting and manipulating the crop material for disintegration primarily by the disintegrator.

24. A crop material processor as claimed in claim 23, wherein the support and manipulation means comprises:
at least two manipulator rollers rotatably mounted inside the container substantially parallel to the flail roller wherein at least one roller is located on each side of the flail roller to define a disintegration opening where crop material is accessed by the disintegrator; and
a number of paddles mounted about each of the rollers, the paddles projecting outwardly from the rollers.

25. A crop material processor as claimed in claim 24, wherein the cross-section of the manipulator rollers is substantially square.

26. A crop material processor as claimed in claim 24, wherein the paddles have a projecting end curved outwardly.

27. A crop material processor as claimed in claim 26, wherein the paddles are channel shaped.

28. A crop material processor as claimed in claim 26, wherein the processor further includes a moveable bottom section for closing the discharge opening on the right of the processor when in a first position and for closing the discharge opening on the left of the processor when in a second position.

29. A crop material processor as claimed in claim 26, wherein the processor further includes rotation conversion means having a first and a second input for alternate connection to a rotating power source and an output connected to the flail roller to provide a direction of rotation to the flail roller opposite to the direction of rotation at the conversion means first input and to provide the same direction of rotation to the flail roller as the direction of rotation at the conversion means second input.

30. A crop material processor as claimed in claim 29, wherein the rotation conversion means comprising a first gear and a second gear positioned to drive one another, the first gear being mounted on a first rotatable shaft having an extended end for providing the conversion means first input and the second gear being mounted on a second rotatable shaft having a first end connected to the flail roller and a second extended end for providing the conversion means second input.

* * * * *